(12) United States Patent
Shafer et al.

(10) Patent No.: US 9,383,190 B1
(45) Date of Patent: Jul. 5, 2016

(54) MEASURING APPARATUS AND METHOD FOR DETERMINING DIMENSIONAL CHARACTERISTICS OF A MEASUREMENT OBJECT

(71) Applicant: Carl Zeiss Industrielle Messtechnik GmbH, Oberkochen (DE)

(72) Inventors: David Shafer, Fairfield, CT (US); Markus Seesselberg, Aalen (DE); Aksel Goehnermeier, Essingen-Lauterburg (DE); Norbert Kerwien, Moegglingen (DE); Thomas Engel, Aalen (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 48 days.

(21) Appl. No.: 14/565,865

(22) Filed: Dec. 10, 2014

(51) Int. Cl.
  *G01J 3/28* (2006.01)
  *G01B 11/00* (2006.01)
  *G01B 11/24* (2006.01)
  *G01B 11/02* (2006.01)

(52) U.S. Cl.
  CPC .............. *G01B 11/005* (2013.01); *G01B 11/02* (2013.01); *G01B 11/24* (2013.01); *G01J 3/28* (2013.01)

(58) Field of Classification Search
  CPC ............. G01J 3/02; G01J 3/28; G01J 3/2803; G01J 3/10; G01J 3/2823
  USPC ......................................................... 356/326
  See application file for complete search history.

(56) References Cited

U.S. PATENT DOCUMENTS

| | | | |
|---|---|---|---|
| 5,785,651 A | 7/1998 | Kuhn et al. | |
| 6,573,989 B2 * | 6/2003 | Suzuki | G01J 3/1809 356/326 |
| 6,674,572 B1 | 1/2004 | Scheruebl et al. | |
| 7,315,371 B2 * | 1/2008 | Kryszczynski | G01J 3/02 356/328 |
| 7,414,740 B2 | 8/2008 | Wilke et al. | |
| 7,561,273 B2 | 7/2009 | Stautmeister et al. | |
| 2001/0024275 A1 * | 9/2001 | Suzuki | G01J 3/1809 356/328 |
| 2008/0180660 A1 * | 7/2008 | Lewis | G01J 3/02 356/300 |
| 2010/0007877 A1 * | 1/2010 | Lewis | G01J 3/10 356/326 |
| 2011/0176142 A1 * | 7/2011 | Hacker | A61B 3/102 356/479 |
| 2013/0010105 A1 * | 1/2013 | Lewis | G01J 3/02 348/135 |
| 2014/0043469 A1 | 2/2014 | Engel et al. | |

FOREIGN PATENT DOCUMENTS

| | | |
|---|---|---|
| DE | 197 13 362 A1 | 10/1998 |
| DE | 10 2005 023 351 A1 | 11/2006 |

* cited by examiner

*Primary Examiner* — Tarifur Chowdhury
*Assistant Examiner* — Md M Rahman
(74) *Attorney, Agent, or Firm* — Harness, Dickey & Pierce, P.L.C.

(57) ABSTRACT

A measuring apparatus and method for determining dimensional characteristics of a measurement object use a sensor head in order to register desired measurement points on the measurement object. The sensor head comprises a polychromatic light source for generating light having various wavelengths of light, a spectrometer, and an optical system having at least one lens element. The optical system produces a first defined range of color dependent foci and a second defined range of color dependent foci in front of the at least one lens element. The spectrometer generates a first spectral information when the measurement object is in the first defined range, and it generates a second spectral information when the measurement object is in the second defined range. An evaluation unit exploits the first spectral range in a coarse measurement mode, and it exploits the second spectral range in a fine measurement mode.

16 Claims, 7 Drawing Sheets

MEASURING APPARATUS AND METHOD FOR DETERMINING DIMENSIONAL CHARACTERISTICS OF A MEASUREMENT OBJECT

BACKGROUND OF THE INVENTION

The present invention relates to a measuring apparatus for determining dimensional characteristics of a measurement object and to a related method of measuring dimensional characteristics. More particularly, the invention relates to a measuring apparatus and method exploiting color dependent foci of an optical system for determining a distance between a sensor head and a measurement point on a measurement object in a non-contact manner.

A typical measuring apparatus for determining dimensional characteristics of a measurement object is a coordinate measuring machine (CMM) comprising a sensor head that is movable relative to the measurement object along one or more orthogonal axes. The sensor head is configured to detect a number of measurement points on the measurement object. The position of the sensor head relative to the detected measurement point or measurements points is transformed into coordinates of a predefined coordinate system. Once the coordinates for a plurality of measurement points are determined, dimensional characteristics of the measurement object, such as the diameter of a bore hole, the depth of a groove or the distance between specific features on the measurement object, can be calculated.

There are various types of sensor heads for coordinate measuring machines. For some applications, non-contact sensor heads are desired. A non-contact sensor head is capable of detecting one or more measurement points without making physical contact to the measurement object.

U.S. Pat. No. 7,414,740 B2 discloses a non-contact sensor head and a method for measuring the thickness of a hot glass body. The sensor head is based on chromatic aberration and exploits the color dependent focus positions of an optical system. The optical system guides polychromatic light from a light source to the measurement object. Reflected light is conducted through the optical system into a spectrometer. The reflected light spectrum is analyzed using the spectrometer and the thickness of the glass body can be determined from the difference between the two wavelengths where the reflected light intensities in the spectrum are maximum.

Other measuring apparatus exploiting color dependent focus positions or focal shift of an optical system are disclosed by DE 197 13 362 A1, U.S. Pat. No. 5,785,651, U.S. Pat. No. 7,561,273 B2 and DE 10 2005 023 351 A1.

It seems as if the existing non-contact sensor heads each have been designed and optimized for certain measurement tasks and applications, such as determining the thickness of a hot glass body. Some designs aimed to achieve a long working distance between the sensor head and the measurement object, which is desirable for measuring deep structures on a measurement object. Other designs are directed to very specific applications, such as the measurement of the cornea of the human eye. Despite these various existing designs, there is a need for a non-contact measuring apparatus and method that can be flexibly used for determining dimensional characteristics of various measurement objects.

SUMMARY OF THE INVENTION

In view of the above, it is an object of the present invention to provide a measuring apparatus and method that allow for a flexible determination of dimensional characteristics of various measurement objects in a non-contact manner.

It is another object to provide for a measuring apparatus and method that can be used both for fast measurements on measurement objects requiring a broad measurement range and on the measurement objects requiring very high accuracy.

It is yet another object to provide a measuring apparatus and method that can be used for cost-efficient measurements on various measurement objects requiring at least one of high measurement accuracy and broad measurement range.

In order to achieve one or more of the afore-mentioned objects, there is provided a measuring apparatus for determining dimensional characteristics of a measurement object, comprising a workpiece table for positioning the measurement object, a sensor head arranged so as to be movable relative to the workpiece table, a controller configured to move the sensor head relative to the workpiece table, an evaluation unit configured to determine a positional information for a defined measurement point on the measurement object using information from the sensor head, and a selector for selecting between a coarse measurement mode and a fine measurement mode, wherein the sensor head comprises a polychromatic light source for generating polychromatic light having various wavelengths of light, a spectrometer, and an optical system having at least one lens element, wherein the optical system is configured to produce a defined range of color dependent foci and a second defined range of color dependent foci in front of the at least one lens element, said second defined range being smaller than said first defined range, wherein the optical system is further configured to conduct light reflected from the measurement object into the spectrometer, wherein the spectrometer generates a first spectral information when the measurement object is in the first defined range, and the spectrometer generates a second spectral information when the measurement object is in the second defined range, and wherein the evaluation unit exploits the first spectral information in the coarse measurement mode and exploits the second spectral information in the fine measurement mode.

There is further provided a sensor head for use in a measuring apparatus for determining dimensional characteristics of a measurement object, the measuring apparatus comprising a workpiece table for positioning the measurement object, an evaluation unit configured to determine a positional information for a defined measurement point on the measurement object, and a selector for selecting between a coarse measurement mode and a fine measurement mode, said sensor head comprising a polychromatic light source for generating polychromatic light having various wavelengths of light, a spectrometer, and an optical system having at least one lens element, wherein the optical system is configured to produce a first defined range of color dependent foci and a second defined range of color dependent foci in front of the at least one lens element, said second defined range being smaller than said first defined range, wherein the optical system is further configured to conduct light reflected from the measurement object into the spectrometer, wherein the spectrometer is configured to generate a first spectral information when the measurement object is in the first defined range, and to generate a second spectral information when the measurement object is in the second defined range, and wherein the spectrometer is configured to provide the first spectral information to the evaluation unit in the coarse measurement mode and to provide a second spectral information to the evaluation unit in the fine measurement mode.

There is also provided a method of measuring dimensional characteristics of a measurement object, comprising the steps of positioning the measurement object on a workpiece table, providing a sensor head at a defined distance from the workpiece table, the sensor head comprising a polychromatic light source for generating polychromatic light having various wavelengths of light, a spectrometer, and an optical system having at least one lens element, the optical system being configured to produce a first defined range of color dependent foci and a second defined range of color dependent foci in front of the at least one lens element, said second defined range being smaller than said first defined range, and the optical system further being configured to conduct light reflected from the measurement object into the spectrometer, selecting between a coarse measurement mode and a fine measurement mode, and determining positional information for a plurality of defined measurement points on the measurement object using information from the spectrometer, wherein the spectrometer generates a first spectral information when the measurement object is in the first defined range, and the spectrometer generates a second spectral information when the measurement object is in the second defined range, and wherein the first spectral information is exploited in the coarse measurement mode and the second spectral information is exploited in the fine measurement mode.

The new measuring apparatus and method make use of a sensor head having an optical system that is designed to provide at least two different ranges of color dependent foci in front of the at least one lens element. The at least two different ranges allow for at least two different measurement modes. The coarse measurement mode is optimized to provide a broad measurement range, thereby allowing fast scanning of measurement objects that require a broad measurement range. A fine measurement mode, in contrast, is optimized for high accuracy. Advantageously, both the coarse measurement mode and the fine measurement mode are implemented using a common optical system. Preferably, the line of sight of the optical system is the same regardless of the measurement mode selected. Light from the polychromatic light source is focused on various foci in front of the at least one lens element of the optical system in both the coarse measurement mode and the fine measurement mode. The new sensor head therefore uses an optical system that is capable of providing suitable focus shift for both the coarse measurement mode and the fine measurement mode within one integrated system. A selector allows to select the mode desired for a specific measurement task.

The new sensor head and the corresponding measuring apparatus and method allow for a quick and flexible change between the at least two measurement modes. In some exemplary embodiments, a measurement object may be measured with high accuracy at some selected locations in the fine measurement mode, while other selected locations are measured with a broader measurement range in the coarse measurement mode. This is particularly useful for measurement objects that have very fine structures in some areas and rather deep structures in others. Further embodiments may use the new method and apparatus in order to carry out a quick scan of a measurement object using the coarse measurement at first, and selected locations of the scanned area are measured again using the fine measurement mode in a second step, but without requiring some new measurement equipment. The new method and apparatus may also advantageously be used when various measurement objects having different structures and features require different capabilities of the measurement system.

In summary of the above, the new method and apparatus make it possible to determine dimensional characteristics of various different measurement objects in a flexible, fast and accurate manner.

In a refinement of the invention, the first defined range and the second defined range are non-overlapping. Preferably, the step of selecting between the coarse measurement mode and the fine measurement mode comprises a step of positioning the measurement object either in the first defined range or in the second defined range. The controller might therefore be configured to move the sensor head relative to the workpiece table in order to position the measurement object either in the first defined range or in the second defined range.

This refinement advantageously allows for a compact and easy implementation of the at least two measurement modes in a combined system. In some advantageous embodiments, the measuring apparatus may use an already existing controller and drive for moving the sensor head relative to the workpiece table in order to select between the coarse and the fine measurement mode. Accordingly, this refinement can advantageously be used in connection with existing coordinate measuring machines, which can be retrofitted using the new sensor head.

In a further refinement, the first defined range at least partially comprises the second defined range.

This refinement allows for a quick change between the coarse measurement mode and the fine measurement mode without moving the sensor head relative to the measurement object. In some preferred embodiments, this refinement might advantageously be used for a simultaneous measurement in both the coarse measurement mode and the fine measurement mode.

In a further refinement, the first defined range and the second defined range both are centered around a focus point defined by one of the various wavelengths of light. Preferably, the first and second defined ranges are centered at a green light focus in some exemplary embodiments.

This refinement is particularly advantageous when a feature of a measurement object should be measured both in the coarse measurement mode and in the fine measurement mode. For example, a measurement object having deep structures might be completely scanned using the coarse measurement mode, and the fine measurement mode is selectively used for measurement points having fine structures, for example in order to detect fine surface variations at the bottom of a deep groove or hole. Centering the measurement ranges at the green light focus facilitates a fast scan along structures having deviations leading both to shorter measurement distances and longer measurement distances (+/− deviations) relative to the at least one lens element.

In a further refinement, the at least one lens element has a defined fixed position relative to the spectrometer, and the optical system further has a movable optical element in order to selectively produce either the first defined range of color dependent foci or the second defined range of color dependent foci.

The optical system of this refinement comprises a lens barrel or any other suitable support structure for the lens elements, and the at least one lens element is a fixed lens element with respect to the lens barrel or support structure. The movable optical element preferably comprises at least one further lens element which determines the operational characteristics of the optical system in terms of color dependent foci. In other words, chromatic aberration of the optical system is dependent on the instant position of the movable element and the movable element allows to selectively change between the coarse and the fine measurement modes.

This refinement enables big differences between the first defined range of color dependent foci and the second defined range of color dependent foci, which makes it possible to optimize the respective characteristics of the optical system for each of the different measuring modes. In some preferred embodiments, this refinement may be used in order to combine a very broad measurement range in the coarse measurement mode with a very high accuracy in the fine measurement mode.

In a further refinement, the at least one lens element defines an optical axis, and the movable optical element is movable transverse and in particular orthogonal to the optical axis. In some embodiments, the movable optical element can be completely removed from the optical axis defined by the at least one fixed lens element. This refinement allows for a rather easy and inexpensive implementation.

In a further refinement, the at least one lens element defines an optical axis, and the movable optical element is movable along said optical axis.

This refinement is advantageous in order to attain a compact design that can be integrated in the Z ram of conventional coordinate measuring machines without too many modifications on the machine.

In a further refinement, the optical system comprises at least one mirror configured for directing the polychromatic light through the at least one lens element.

This refinement can lead to a very small central obscuration with a high magnification. In addition, maintaining the "green focus" in the same actual position for both the coarse measurement mode and the fine measurement mode is advantageously facilitated.

In a further refinement, the optical system comprises at least one of a switchable polarizer and a switchable shutter in order to selectively produce either the first defined range of color dependent foci or the second defined range of color dependent foci in front of the at least one lens element.

Two different light paths are established in the optical system according to this refinement. Selecting between the coarse measurement mode and the fine measurement mode is enabled by selecting one of the at least two different light paths. This refinement facilitates high accuracy design with only a small number of movable lightweight elements. Accordingly, the refinement facilitates fast switching between the measurement modes.

In a further refinement, the optical system is designed so as to have a non-linear chromatic aberration characteristic having a first part corresponding to the first defined range of color dependent foci and having a second part corresponding to the second defined range of color dependent foci.

This refinement advantageously makes use of a non-linear characteristic of the optical system in order to implement the at least two defined ranges of color dependent foci. In some preferred embodiments, this refinement allows for an implementation without movable optical elements. Proper selection of the lens powers and/or the glass types makes it possible to design the non-linear characteristic in such a manner that the coarse measurement mode and the fine measurement mode both are optimized for their respective applications. Avoiding movable optical elements facilitates an inexpensive and/or robust design.

In further refinement, the sensor head is arranged at an axial distance from the workpiece table, and the selector is coupled to the controller in order to move the sensor head relative to the workpiece table along said axial distance in order to select between the coarse measurement mode and the fine measurement mode.

As already indicated above, this refinement may advantageously make use of existing drives of a coordinate measuring machine or similar type of device in order to select between the coarse measurement mode and the fine measurement mode. This is particularly advantageous in combination with an optical system that has a non-linear chromatic aberration designed for implementing the first and second defined ranges of color dependent foci. The refinement enables a cost effective implementation of the new measuring apparatus and method.

In a further refinement, the first defined range has a center focus located at a defined spacing from the at least one lens element, said defined spacing being at least three times as big as the first defined range.

In this refinement, the working distance of the optical system is at least three times bigger than the measurement range in the coarse measurement mode. The refinement facilitates fast scanning of measurement objects having deep structures.

In a further refinement, the optical system comprises a plurality of lens elements including a positive lens element made of a first glass type and a negative second lens element made of second glass type, said first glass type having a higher dispersion than the second glass type.

This refinement is contrary to typical optical design rules, where positive lenses with low dispersion glass types are combined with negative lenses with high dispersion glass types. The refinement advantageously allows to implement broad measurement ranges, especially in the coarse measurement mode by producing a broad color dependent focus shift.

It goes without saying that the features mentioned above and yet to be explained below can be used not only in the respective recited combination, but also in other combinations or on their own without departing from the scope of the present invention.

BRIEF DESCRIPTION OF THE DRAWING

Exemplary embodiments are illustrated in the drawing and will be explained in more detail in the description below. In the drawing.

DETAILED DESCRIPTION OF PREFERRED EMBODIMENTS

Figure 1:
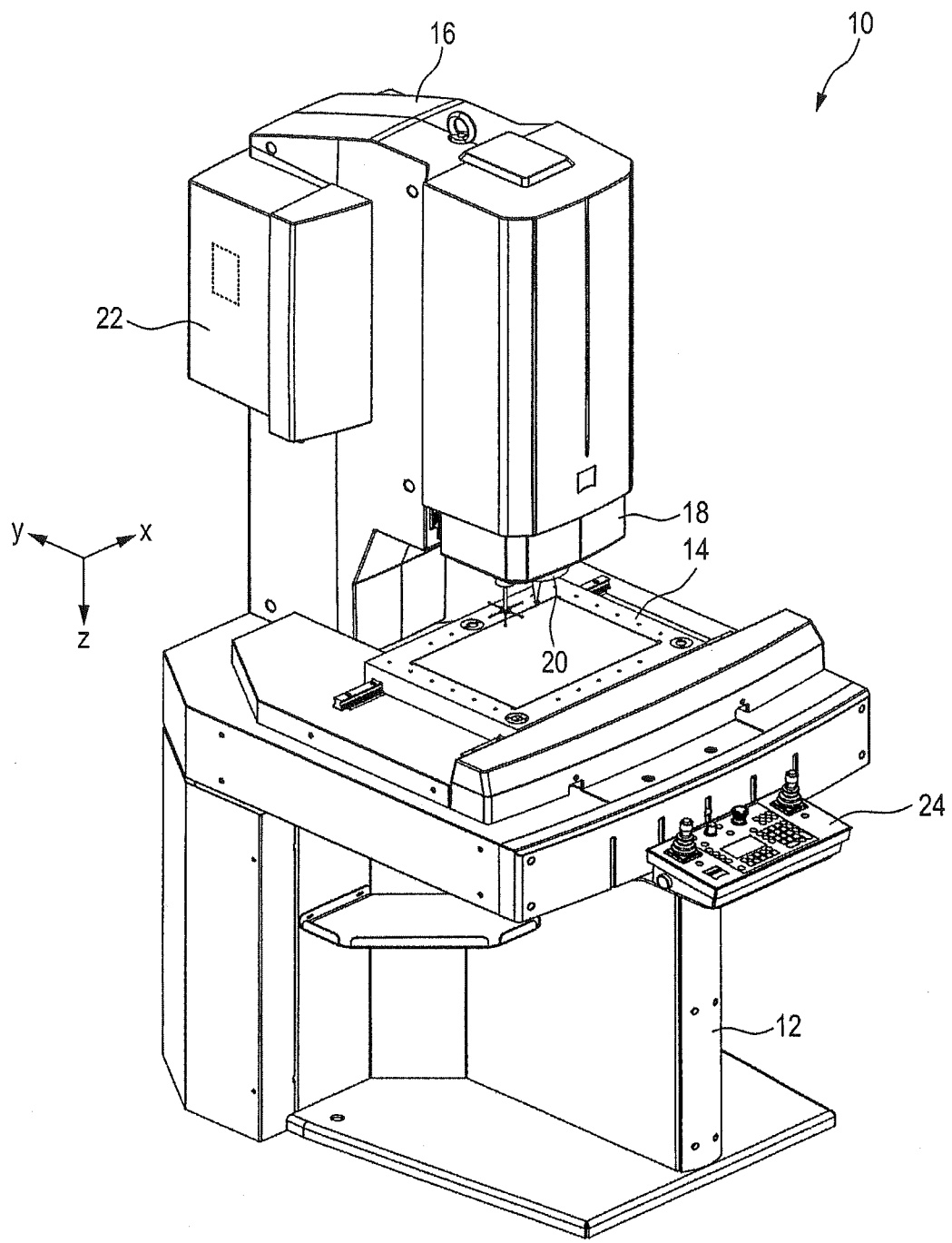
FIG. 1 shows a perspective view of a coordinate measuring machine making use of the new sensor head and method.

In FIG. 1, reference number 10 designates a coordinate measuring machine (CMM) as an exemplary embodiment of the new measuring apparatus. CMM 10 has a base 12 on which a workpiece table 14 is arranged so as to be movable in two orthogonal directions, which are typically designated as X direction and Y direction. Base 12 further supports a column 16 which holds a ram 18. Ram 18 is movable relative to column 16 and, accordingly, relative to workpiece table 14 in a third orthogonal direction which is typically designated as Z direction. Ram 18 carries a sensor head 20, which is movable relative to workpiece table 14 along the three orthogonal directions X, Y, Z in this embodiment. In some preferred embodiments, the sensor head 20 comprises an optical system as described in further detail below, and a contact probe as shown in FIG. 1. In other embodiments, sensor head 20 only comprises the optical system and further components explained with reference to the following figures, but no contact probe.

CMM 10 further comprises a control and evaluation unit 22 and a control panel 24. Control and evaluation unit 22 is designed to control the relative movement of the sensor head 20 in accordance with a measuring program loaded into control and evaluation unit 22 and/or in accordance with control instructions generated via control panel 24. In addition, control and evaluation unit 22 comprises an evaluation program for evaluating information provided by the sensor head and provided by position encoders (not shown here). The position encoders generate positional information representing the relative position of the sensor head 20 and the workpiece table 14. In some embodiments, the control and evaluation unit may be implemented using an industrial computer. In other embodiments, control of the machine movements and evaluation of the various measurement information might be implemented using two separate pieces of hardware.

The structure of the CMM 10 is shown here by way of example, because there are various other types of apparatus that can advantageously use the sensor head described in more detail below.

Figure 2:
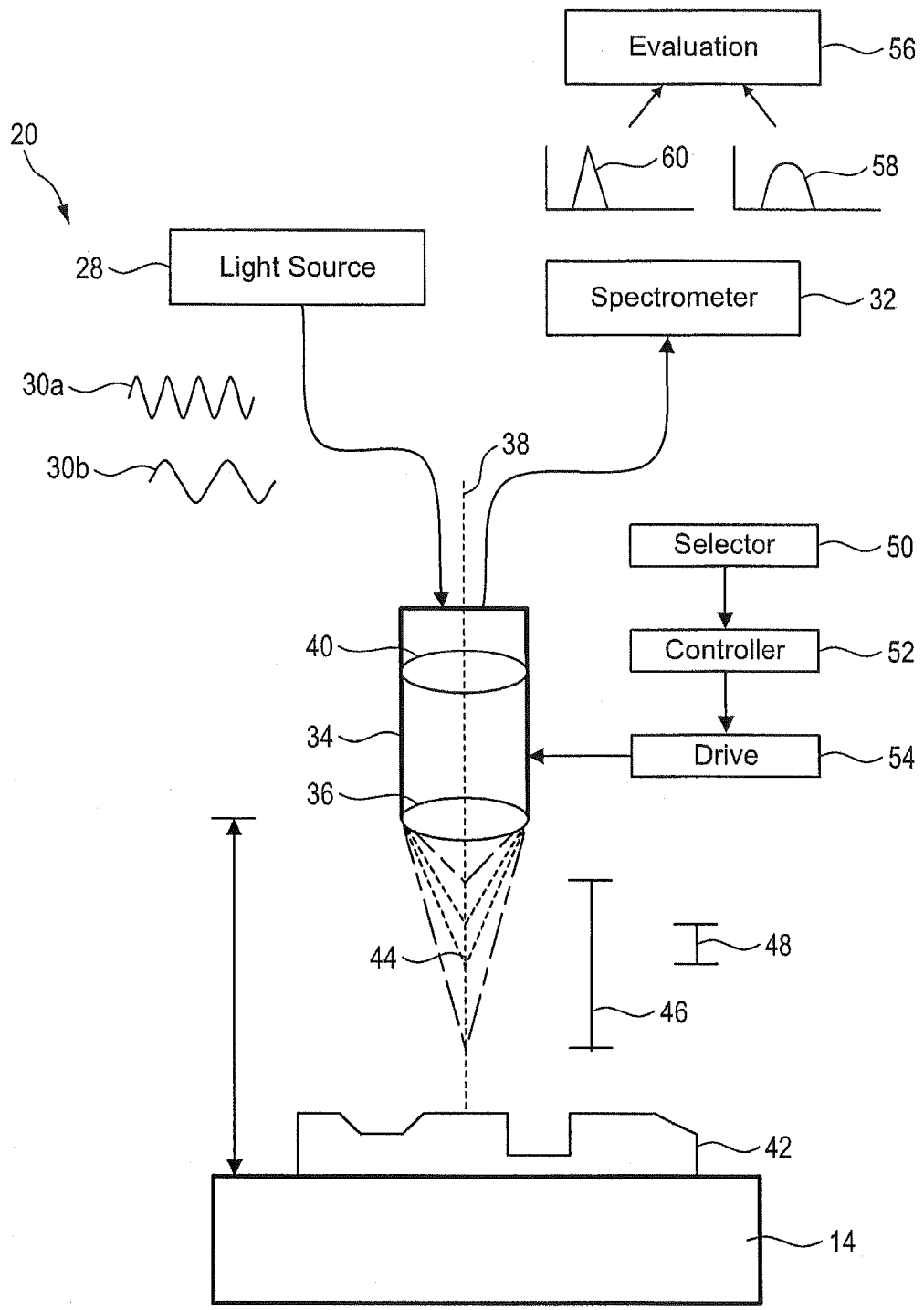
FIG. 2 shows a schematic illustration of some components of the coordinate measuring machine of FIG. 1, FIGS. 3a and b show an optical system in accordance with a first embodiment, FIGS. 4a and b show an optical system in accordance with a second embodiment, FIGS. 5a and b show an optical system in accordance with a third embodiment, FIGS. 6a and b show an optical system having a non-linear characteristic in accordance with a further embodiment.

FIG. 2 shows some functional elements of the new sensor head 20 in a simplified illustration. Sensor head 20 comprises a light source 28 designed to generate polychromatic light with a plurality of different wavelengths 30a, 30b. Sensor head 20 further comprises a spectrometer 32 and an optical system 34. The optical system 34 is shown here in a simplified form with a first lens element 36 defining an optical axis 38 and a further lens element 40. A more detailed description of suitable embodiments will follow further below.

Typically, optical system 34 comprises a lens barrel or some other support structure, where lens elements 36, 40 and further optical elements, if any, are supported. The optical system 34 with the lens elements 36, 40 is arranged here above of a measurement object 42 arranged on workpiece table 14. As will be readily understood, measurement object 42 can be moved relative to optical system 34 along the orthogonal directions X, Y, Z in some preferred embodiments. It should be understood, however, that other embodiments may comprise only one or two degrees of movement between optical system 34 and measurement object 42.

Optical system 34 is designed to guide the polychromatic light from light source 28 onto measurement object 42. Light reflected from measurement object 42 is conducted to spectrometer 32 through the optical system 34. Optical system 34 is designed to produce a plurality of color dependent foci (focal shift) in front of the first lens element 36. In other words, optical system 34 generates a plurality of focus positions in front of lens element 36, which plurality of focus positions depend on the respective wavelengths of light. For example, a focus position 44 for a wavelength corresponding to green light might be located at a medium distance from first lens element 36, while shorter and longer wavelengths result in focus positions at smaller and greater distances, respectively. A measurement point on the measurement object 42 will produce reflected light with the highest intensity at the wavelength corresponding to the focus position 44 where the respective measurement point is located. Accordingly, the distance from optical system 34 to the respective measurement point can be determined by using information from spectrometer 32.

As is schematically indicated in FIG. 2, optical system 34 is designed to produce a rather broad range 46 of color dependent focus positions and, additionally, a rather small range 48 of color dependent focus positions. Therefore, optical system 34 enables measurements over a broad measurement range 46 on the one hand, and over a small measurement range 48 on the other hand. The desired measurement range can be selected by selector 50 which can be implemented in various ways, as will be described further below. In some embodiments, selector 50 may be coupled to control panel 24 such that an operator can select a measurement mode using control panel 24. In some embodiments, selector 50 may be coupled to controller 52 in order to move optical system 34 relative to measurement object 42 in a direction parallel to optical axis 38. In some further embodiments, selector 50 may be coupled to evaluation unit 56 in order to enable the operator to select between various measurement modes. In accordance with preferred embodiments, selector 50 allows to select between a coarse measurement mode and a fine measurement mode, wherein the evaluation unit 56 exploits spectral information 58 from spectrometer 32 in the coarse measurement mode, and wherein evaluation unit 56 exploits other spectral information 60 from spectrometer 32 in the fine measurement mode. Spectral information 58 is generated by spectrometer 32 when the broad measurement range 46 is used, while spectral information 60 is generated by spectrometer 32 when the narrow measurement range 48 is used.

Figure 3A:
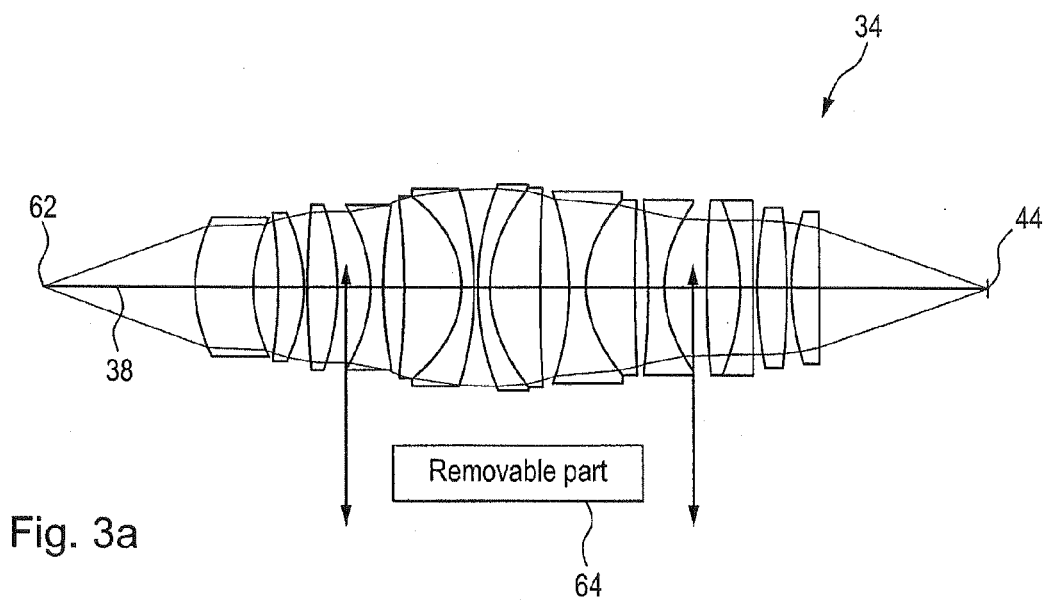
Figure 3B:
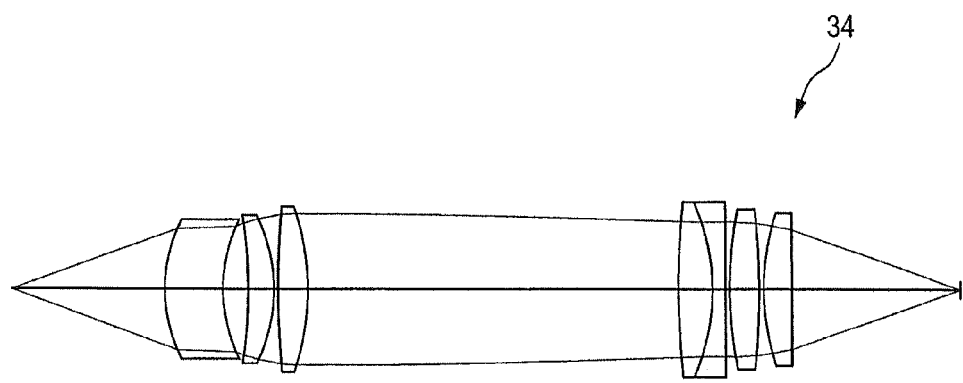

FIGS. 3a and 3b show some details of optical system 34 in accordance with a first embodiment. Optical system 34 of this first embodiment comprises a pin hole 62 which the reflected light has to pass in order to arrive at spectrometer 32. A plurality of lens elements is designed to focus the polychromatic light onto a plurality of focus positions. Optical system 34 of this embodiment comprises a removable lens part 64. Lens part 64 can be moved transverse to the optical axis 38 in order to remove lens part 64 from the optical axis 38, as it is shown in FIG. 3b. By moving in or moving out lens part 64, the optical behavior of optical system 34 can be changed. If removable part 64 is in the position according to FIG. 3a, a broad range 46 of +/−2.5 mm is achieved in one embodiment having design data as follows:

| SRF | RADIUS | THICKNESS | APERTURE | GLASS |
| --- | --- | --- | --- | --- |
| OBJ | — | 16.915707 V | 0.050000 | AIR* |
| 1 | 20.106891 V | 10.000178 V | 8.500000 | SK16 |
| 2 | 20.112561 V | 3.000000 | 8.500000 | AIR |
| 3 | −80.498694 V | 3.000000 | 9.000000 | SK16 |
| 4 | −23.087879 V | 0.500000 | 9.000000 | AIR |
| 5 | 137.884146 V | 3.500000 | 10.000000 | SK16 |
| 6 | −29.059336 V | 4.000000 | 10.000000 | AIR |
| 7 | −17.907846 V | 1.500000 | 10.000000 | SK16 |
| 8 | 54.006174 V | 2.500000 | 10.000000 | AIR |
| 9 | −88.945220 V | 7.000000 | 10.000000 | SF6 |
| 10 | −13.000000 | 1.500000 | 11.000000 | BK7 |
| 11 | −37.348163 V | 0.500000 | 12.000000 | AIR |
| 12 | 34.891870 V | 1.500000 | 12.500000 | BK7 |
| 13 | 17.954964 V | 6.000000 | 12.000000 | SF6 |
| 14 | 263.839721 V | 3.500000 | 12.000000 | AIR |
| 15 | −34.217553 V | 2.000000 | 11.500000 | BK7 |
| 16 | 14.525028 V | 6.000000 | 10.500000 | SF6 |
| 17 | 321.514544 V | 1.500000 | 10.500000 | AIR |
| 18 | −97.468826 V | 2.000000 | 10.500000 | BK7 |
| 19 | 16.285125 V | 5.000000 | 10.000000 | AIR |
| 20 | 94.763378 V | 4.000000 | 10.500000 | BK7 |
| 21 | −30.332520 V | 1.500000 | 10.500000 | SF6 |
| 22 | 1.3274e+03 V | 0.500000 | 10.500000 | AIR |

-continued

| SRF | RADIUS | THICKNESS | APERTURE | GLASS |
|---|---|---|---|---|
| 23 | 49.658159 V | 3.500000 | 9.500000 | SK16 |
| 24 | −72.263856 V | 0.500000 | 9.000000 | AIR |
| 25 | 26.321649 V | 3.500000 | 9.000000 | SK16 |
| 26 | 1.3012e+03 V | 20.000000 | 9.000000 | AIR |
| IMS | — | — | 1.000000 | * |

Part 64 comprises optical element Nos. 7 to 19. If part 64 is removed from optical axis 38, a narrow range 48 of +/−0.25 mm color focus shift is achieved in this exemplary embodiment. Removable part 64 might be arranged on a support plate (not shown here) which can be pivoted back and forth in some embodiments. The embodiment shown in FIGS. 3a and 3b has a long working distance of 20 mm, for example, which is desirable, and forms a spot size of about 1.0 μm throughout that axial range. The axial position of the green light focus does not change when part 64 is removed. This design can also be done in other magnifications. In some embodiments, a magnification of 10× or 20× is desirable, because this allows for a larger pin hole 62 and thereby facilitates fibers having a larger diameter for guiding the polychromatic light from light source 28 to optical system 34. In some advantageous embodiments, one or more pinholes are used instead of or in addition to light guiding fibers in order to limit the reflected light impinging on the spectrometer for a more precise measurement. Preferably, the pinhole or the pinholes in an array of pinholes has or each have a diameter that is greater than the thickness of the material in which the pinhole or pinholes are arranged. The greater the diameter of the pinhole or pinholes can be, the more stable and cost-efficiently can the pinholes be made.

Figure 4A:
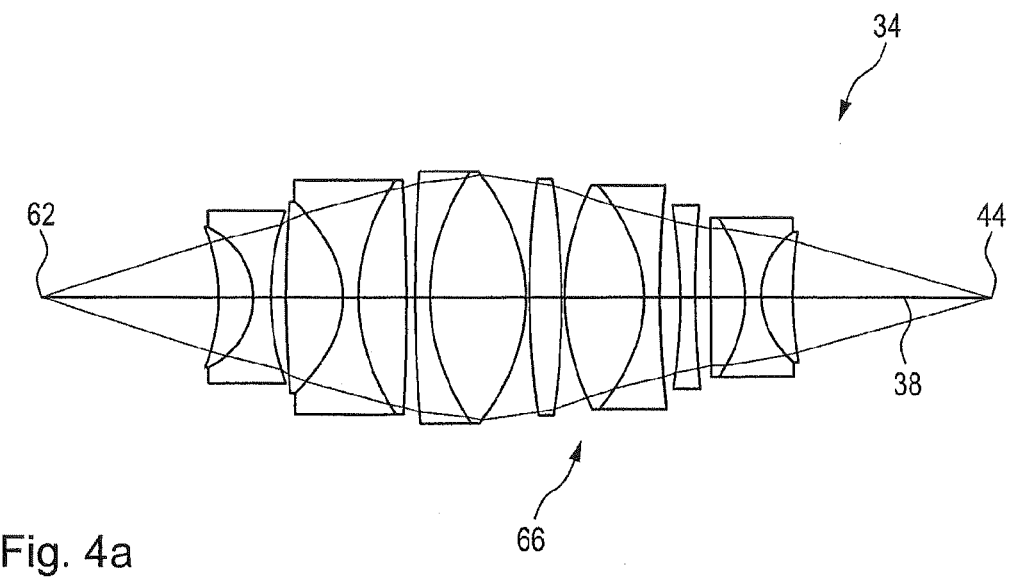
Figure 4B:
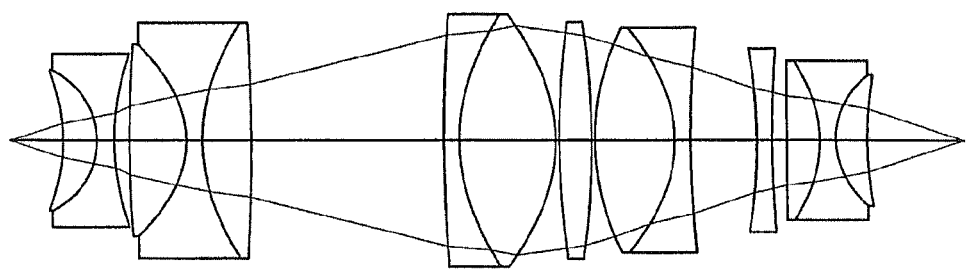

FIGS. 4a and 4b show another embodiment for optical system 34. In contrast to the first embodiment, an intermediate lens part 66 can be moved along optical axis 38 in order to change the color focus shift of sensor head 20. Exemplary design parameter for this embodiment are:

| SRF | RADIUS | THICKNESS | APERTURE | |
|---|---|---|---|---|
| OBJ | — | 23.514278 V | 0.050000 | AIR changes to 7.0 mm to change mode of operation |
| 1 | −25.235375 V | 4.500000 | 8.000000 A | SF6 C |
| 2 | −10.000000 | 2.000000 | 9.000000 | SK16 C |
| 3 | 27.136848 V | 2.250000 | 11.000000 | AIR |
| 4 | 254.583146 V | 6.750000 | 11.500000 | SF6 C |
| 5 | −15.000000 | 2.000000 | 11.500000 | SK16 C |
| 6 | 24.144534 V | 6.500000 | 15.000000 | SF6 C |
| 7 | −382.935542 V | 1.000000 | 15.000000 | AIR changes to 24.5473 mm to change modes |
| 8 | 176.838909 V | 2.000000 | 16.000000 | SF6 C |
| 9 | 26.847703 V | 13.000000 | 16.000000 | SK16 C |
| 10 | −24.280758 V | 0.500000 | 16.000000 | AIR |
| 11 | 105.676404 V | 4.000000 | 15.000000 | SK16 C |
| 12 | −107.743760 V | 0.500000 | 15.000000 | AIR |
| 13 | 29.690217 V | 10.000000 | 14.000000 | SK16 C |
| 14 | −20.000000 | 2.000000 | 14.000000 | SF6 C |
| 15 | 158.960334 V | 2.000000 | 14.000000 | AIR changes to 7.1963 mm to change modes |
| 16 | −68.154654 V | 2.000000 | 11.500000 | SK16 C |
| 17 | 92.059270 V | 1.750000 | 11.500000 | AIR |
| 18 | −118.589068 V | 5.000000 | 10.000000 | SF6 C |
| 19 | −14.507876 V | 2.000000 | 10.000000 | SK16 C |
| 20 | 10.000000 | 3.500000 | 8.000000 | SF6 C |
| 21 | 26.697745 V | 24.235722 V | 8.000000 | AIR focus position for .60 u. Changes to 12.0064 mm to change modes and be at .50 u focus |
| IMS | — | — | 0.051924 S | |

Figure 5A:
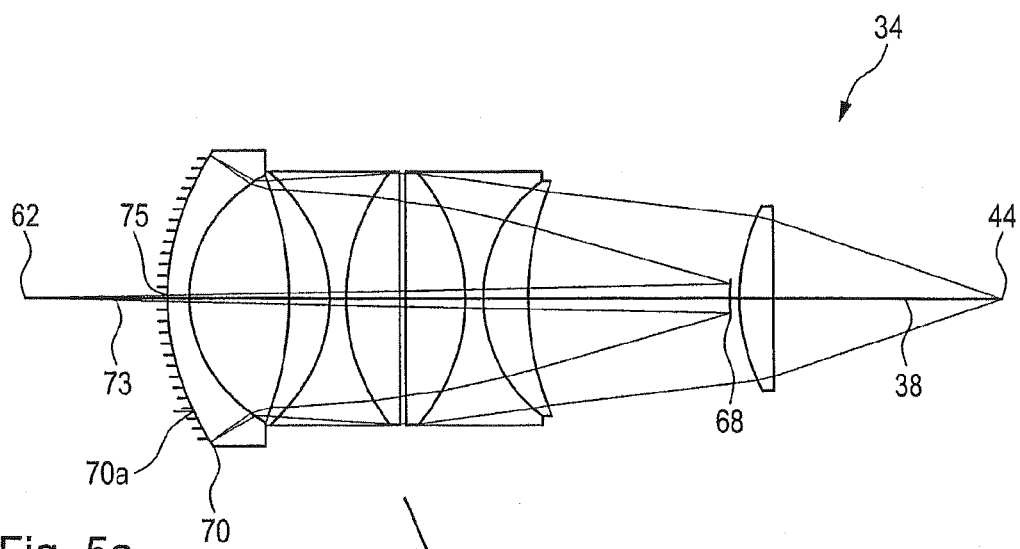
Figure 5B:
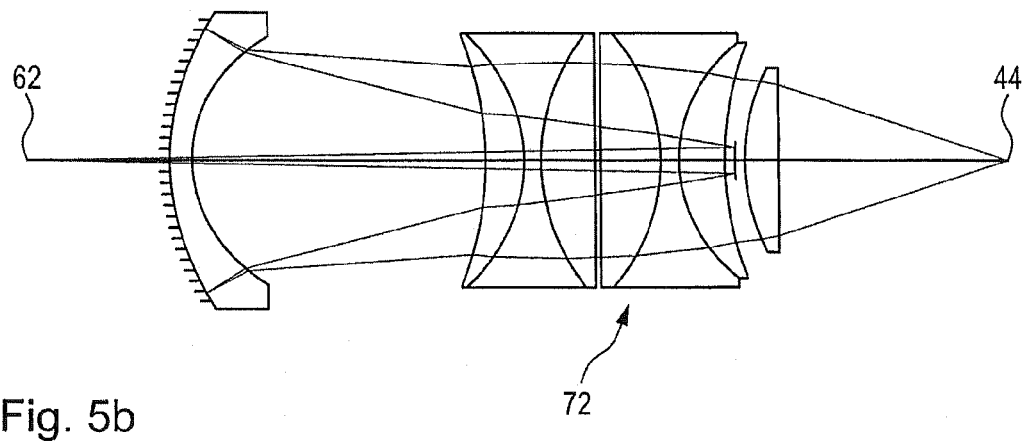

FIGS. 5a and 5b show optical system 34 in accordance with another embodiment that uses a catadioptric design with two mirror reflections at mirrors 68, 70. Because of the folded light paths, the polychromatic light goes through the lenses several times and that allows for fewer lenses having more axial color shift. As FIGS. 5a and 5b show, lens group 72 containing most of the optical elements is shifted along optical axis 38 in order to switch between the modes of operation. This design has a very small central obscuration and a large pin hole size due to a 20× magnification. The green focus is in the same axial position for both modes of operation. Advantageously, the positive lenses in this and other embodiments are made of high dispersion glass and combined with negative lenses of low dispersion glass. Design parameters for this embodiment are:

| SRF | RADIUS | THICKNESS | APERTURE | |
|---|---|---|---|---|
| OBJ | — | 25.000000 | 0.100000 | AIR*<br>Airspace changes to 47,758 mm to change mode of operation |
| 1 | −44.023224 V | 4.000000 | 12.00000 | SF6* |
| 2 | −15.500000 | 1.500000 | 12.000000 | LAK21 |
| 3 | 19.124052 V | 5.000000 | 12.000000 | SF6 |
| 4 | −1.2387e+03 V | 0.500000 | 12.000000 | AIR |
| 5 | 1.5348e+03 V | 5.000000 | 12.000000 | SF6 |
| 6 | −18.176565 V | 1.500000 | 12.000000 | LAK21 |
| 7 | 13.709201 V | 4.000000 | 10.500000 | SF6 |
| 8 | 30.964938 V | 23.758107 V | 10.000000 | AIR<br>changes to 1.0 mm |
| 9 | 10.240210 V | −23.758107 P | 2.000000 | REFL |
| 10 | 30.964938 P | −4.000000 | 10.000000 | SF6 |
| 11 | 13.709201 P | −1.500000 | 10.500000 | LAK21 |
| 12 | −18.176565 P | −5.000000 | 12.000000 | SF6 |
| 13 | 1.5348e+03 P | −0.500000 | 12.000000 | AIR |
| 14 | −1.2387e+03 P | −5.000000 | 12.000000 | SF6 |
| 15 | 19.124052 P | −1.500000 | 12.000000 | LAK21 |
| 16 | −15.500000 P | −4.000000 | 12.000000 | SF6 |
| 17 | −44.023224 P | −8.995101 V | 12.000000 | AIR*<br>changes to −31.7528 mm |
| 18 | 13.124775 V | −2.000000 | 11.500000 | SF6 |
| 19 | 26.111507 V | 2.000000 | 14.000000 | REFL |
| 20 | 13.124775 P | 8.995101 P | 11.500000 | AIR |
| 21 | −44.023224 P | 4.000000 | 12.000000 | SF6* |
| 22 | −15.500000 P | 1.500000 | 12.000000 | LAK21 |
| 23 | 19.124052 P | 5.000000 | 12.000000 | SF6 |
| 24 | −1.2387e+03 P | 0.500000 | 12.000000 | AIR |
| 25 | 1.5348e+03 P | 5.000000 | 12.000000 | SF6 |
| 26 | −18.176565 P | 1.500000 | 12.000000 | LAK21 |
| 27 | 13.709201 P | 4.000000 | 10.500000 | SF6 |
| 28 | 30.964938 P | 24.757068 V | 10.000000 | AIR<br>changes to 2.0000 mm |
| 29 | 16.418636 V | 3.000000 | 8.000000 | BK7 |
| 30 | 92.616019 V | 24.615328 V | 8.000000 | AIR |
| IMS | — | — | 0.014140S | |

*ASPHERIC SURFACE DATA

| 1 | ASP ASR 10 - SYMMETRIC GENERAL ASPHERE | | | | | |
|---|---|---|---|---|---|---|
| | AS0 — AS1 — AS2 | −1.3349e−05 | AS3 | −9.7253e−09 | AS4 | −7.8777e−11 |
| 17 | ASP ASR 10 - SYMMETRIC GENERAL ASPHERE | | | | | |
| | AS0 — AS1 — AS2 | −1.3349e−05 | AS3 | −9.7253e−09 | AS4 | −7.8777e−11 |
| 19 | ASP ASR 10 - SYMMETRIC GENERAL ASPHERE | | | | | |
| | AS0 — AS1 — AS2 | 1.4710e−06 | AS3 | 1.9576e−09 | AS4 | — |
| 21 | ASP ASR 10 - SYMMETRIC GENERAL ASPHERE | | | | | |
| | AS0 — AS1 — AS2 | −1.3349e−05 | AS3 | −9.7253e−09 | AS4 | −7.8777e−11 |

It should be noted that FIG. 5a seems to show light beam 73 passing through mirror 70. In practice, however, mirror 70 has a hole 75 allowing light beam 73 to pass mirror 70. In some embodiments, hole 75 is a through hole provided in the first lens element which is coated by a reflecting layer 70a in order to form mirror 70. In other preferred embodiments, hole 70 is only made in the reflecting layer 70a applied on the supporting lens element, but not in the glass body of the lens element. In the preferred embodiments, hole 75 has a diameter that corresponds the diameter of beam 73 at the location of the hole 75.

Figure 6A:
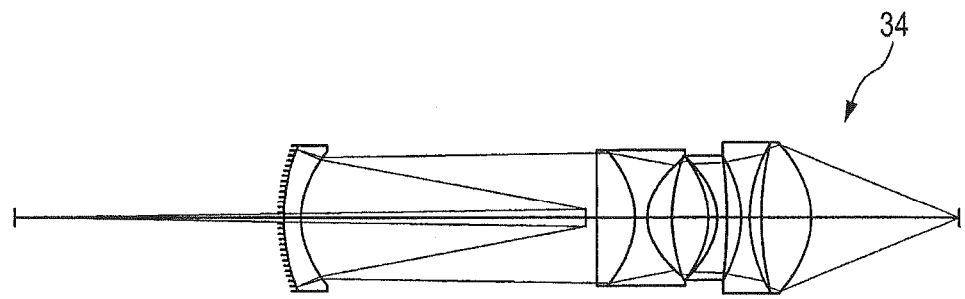
Figure 6B:
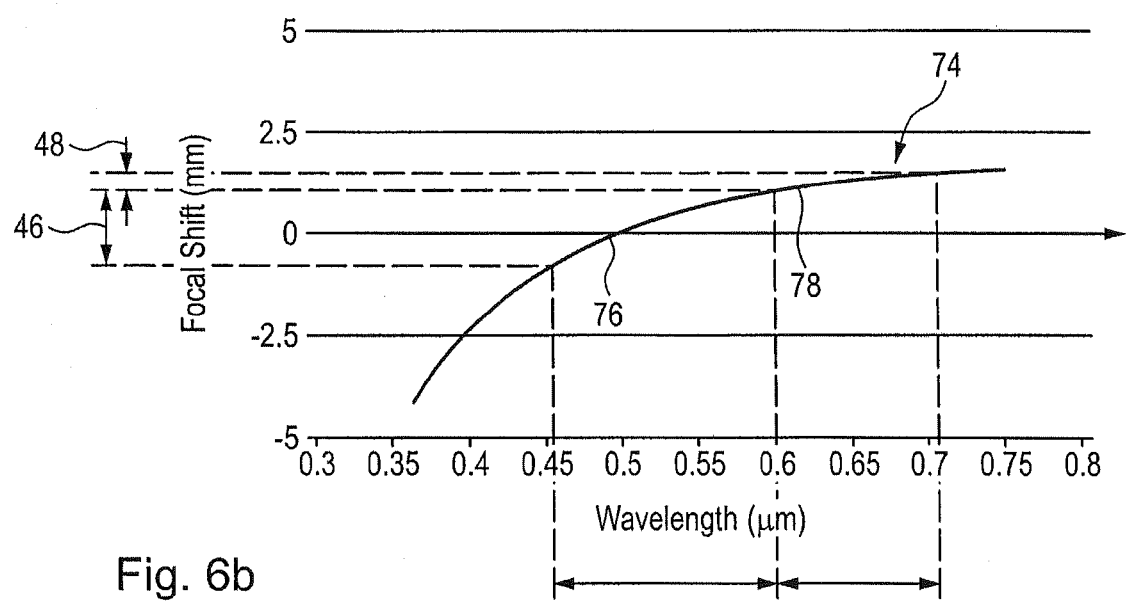

FIGS. 6a and 6b show another advantageous embodiment for optical system 34. In this case, no movable optical elements are required. Instead, use is made of a non-linear chromatic aberration characteristic 74 of optical system 34. As can be seen in FIG. 6b, characteristic 74 has a rather steep area 76 and a less steep (more flat) area 78. For example, if a first range of wavelengths from 0.45 to 0.60 μm is used, a broad measurement range with a broad focal shift is achieved. If instead wavelengths between 0.6 μm and 0.7 μm are used, a narrow measurement range leading to higher measurement accuracy is achieved. In another embodiment, a range of wavelengths from 0.35 to 0.55 μm is used, with the first range providing a focal shift from −4 mm to +0.8 mm and the second range providing a focal shift from +0.8 mm to +2.3 mm. Broader focal shift range 46 corresponds to the coarse measurement mode, while smaller range 48 corresponds to the fine measurement mode. Selection between the two measurement modes may be made here by selecting, which spectral range is evaluated by evaluation unit 56. In some embodiments, optical system 34 is moved along optical axis 38 by controller 52 and drive 54 in order to bring measurement object 42 into the desired measurement range.

Design parameters for an embodiment in accordance with FIGS. 6a, 6b are as follows:

| SRF | RADIUS | | THICKNESS | | APERTURE | | |
|---|---|---|---|---|---|---|---|
| OBJ | — | | 100.000000 | | 1.000000 | | AIR* |
| 1 | 20.000000 | | −50.000000 | | 1.700246A | S | REFL |
| 2 | 17.124377 | V | −3.000000 | | 11.551597 | S | SF4 |
| 3 | 35.316058 | V | 3.000000 | | 12.766446 | S | REFL |
| 4 | 17.124377 | P | 52.000000 | | 11.812347 | S | AIR |
| 5 | 212.525313 | V | 7.000000 | | 12.000000 | | SF4 |
| 6 | −16.484509 | V | 2.000000 | | 12.000000 | | BK7 |
| 7 | 11.900395 | V | 4.000000 | | 10.500000 | | AIR |
| 8 | 30.864902 | V | 6.500000 | | 11.000000 | | SF4 |
| 9 | −16.829411 | V | 1.534918 | V | 11.000000 | | AIR |
| 10 | −13.317599 | V | 1.500000 | | 10.500000 | | BK7 |
| 11 | −96.113294 | V | 2.500000 | | 11.000000 | | AIR |
| 12 | −20.847743 | V | 1.500000 | | 11.000000 | | BK7 |
| 13 | 24.907664 | V | 2.000000 | | 13.000000 | | AIR |
| 14 | 46.324063 | V | 9.000000 | | 13.000000 | | SF4 |
| 15 | −17.565161 | V | 25.24852 | | 13.000000 | | AIR |

Design parameters for an alternative embodiment in accordance with FIG. 6a, but with a more flat characteristic at higher wavelengths are as follows:

| SRF | RADIUS | | THICKNESS | APERTURE | | |
|---|---|---|---|---|---|---|
| OBJ | — | | 100.000000 | 1.000000 | | AIR* |
| 1 | 20.000000 | | −50.000000 | 1.716253 | AS | REFL |
| 2 | 15.970184 | V | −3.000000 | 11.655643 | S | SF57 |
| 3 | 31.486183 | V | 3.000000 | 12.981440 | S | REFL |
| 4 | 15.970184 | V | 52.000000 | 11.833497 | S | AIR |
| 5 | −123.436815 | V | 5.000000 | 10.500000 | | SF57 |
| 6 | −14.154609 | V | 2.000000 | 10.500000 | | FK51 |
| 7 | 10.771910 | V | 3.000000 | 8.000000 | | AIR |
| 8 | 53.433762 | V | 4.000000 | 9.000000 | | SF57 |
| 9 | −17.808135 | V | 1.500000 | 9.000000 | | AIR |
| 10 | −11.662093 | V | 1.000000 | 9.000000 | | FK51 |
| 11 | −205.648412 | V | 1.500000 | 9.000000 | | AIR |
| 12 | −22.689790 | V | 1.500000 | 8.000000 | | FK51 |
| 13 | 19.688428 | V | 2.000000 | 9.000000 | | AIR |
| 14 | 58.800338 | V | 5.000000 | 9.500000 | | SF57 |
| 15 | −14.930317 | V | 24.06273 | 9.500000 | | AIR |

Figure 7:
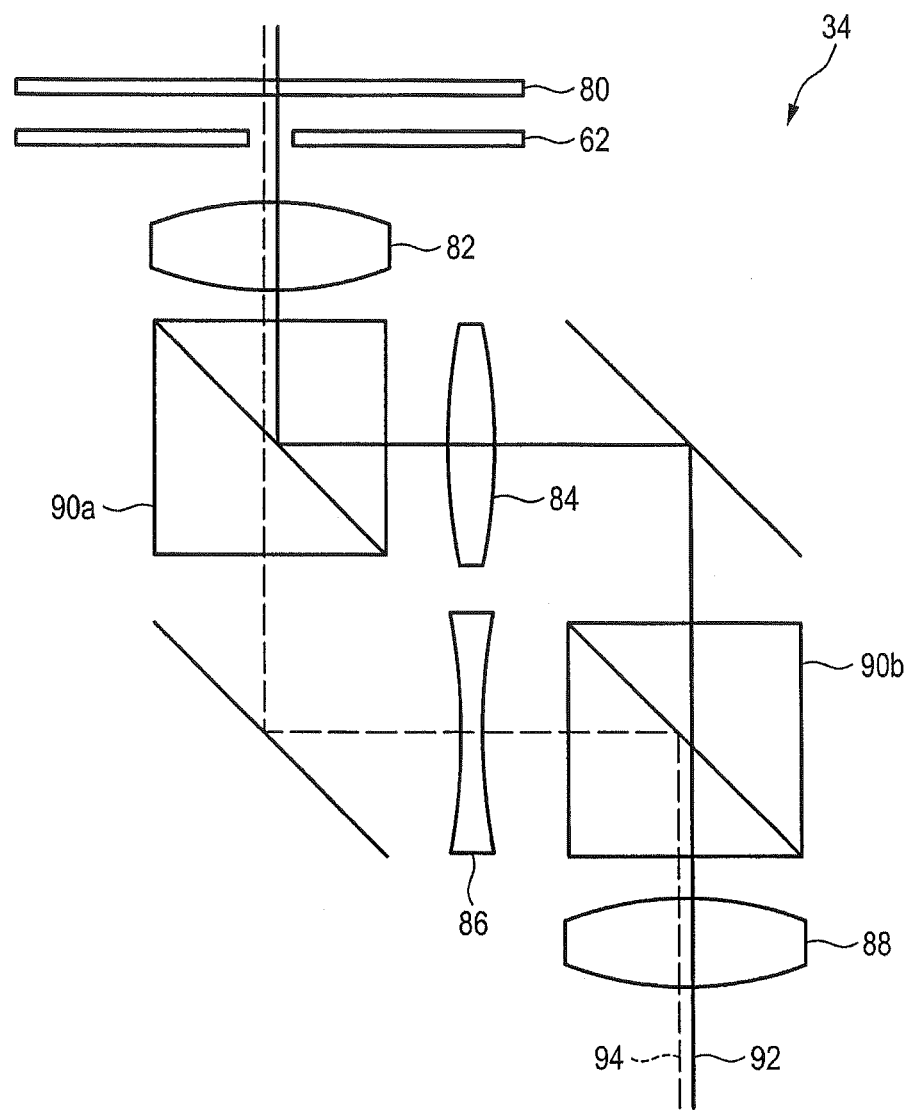
FIG. 7 shows an optical system in accordance with yet another embodiment.

FIG. 7 shows yet another embodiment for optical system 34. In this embodiment, system 34 comprises a switchable polarizer 80 located in front of pin hole 62. A first fixed lens element 82, two alternative second lens elements 84, 86, and a further lens element 88 define two alternative optical paths. In some embodiments, lens element 84 may comprise or may be a positive lens, while lens element 84 may comprise or may be a negative lens. A first polarization dependent splitter 90a is arranged between first lens element 82 and alternative second lens elements 84, 86. A second splitter 90b is arranged between alternative second lens elements 84, 86 and further lens element 88. Depending on the polarization of the polychromatic light, which can be changed by means of switchable polarizer 80, the polychromatic light is guided either along a first path 92 or along a second path 94. First light path 92 produces a broad focal shift range, while second path 94 produces a narrow focal shift range.

In yet another embodiment, optical system 34 may use a switchable shutter arranged in order to allow for selecting between two or more alternative light paths, wherein the alternative light paths again provide for different focal shift ranges in one optical system.

In some embodiments, a prism or a dichroitic mirror may be used in order to shape the beam paths and/or in order to mutually overlap the separate focal shift ranges shown in FIG. 6b.

What is claimed is:

1. A measuring apparatus for determining dimensional characteristics of a measurement object, comprising:
    a workpiece table for positioning the measurement object,
    a sensor head arranged so as to be moveable relative to the workpiece table,
    a controller configured to move the sensor head relative to the workpiece table,
    an evaluation unit configured to determine positional information for a defined measurement point on the measurement object using information from the sensor head, and
    a selector for selecting between a coarse measurement mode and a fine measurement mode,
    wherein the sensor head comprises a polychromatic light source for generating polychromatic light having various wavelengths of light, a spectrometer, and an optical system having at least one lens element,
    wherein the optical system is configured to produce a first defined range of color dependent foci and a second defined range of color dependent foci in front of the at least one lens element, said second defined range being smaller than said first defined range,
    wherein the optical system is further configured to conduct light reflected from the measurement object onto the spectrometer,
    wherein the spectrometer generates a first spectral information when the measurement object is in the first defined range, and the spectrometer generates a second spectral information when the measurement object is in the second defined range, and
    wherein the evaluation unit exploits the first spectral information in the coarse measurement mode and exploits the second spectral information in the fine measurement mode.

2. The measuring apparatus of claim 1, wherein the first defined range and the second defined range are non-overlapping.

3. The measuring apparatus of claim 1, wherein the first defined range comprises the second defined range at least partially.

4. The measuring apparatus of claim 1, wherein the first defined range and the second defined range both are centered around a focus point defined by one of the various wavelengths of light.

5. The measuring apparatus of claim 1, wherein the at least one lens element has a defined fixed position relative to the spectrometer, and wherein the optical system further has a moveable optical element in order to selectively produce either the first defined range of color dependent foci or the second defined range of color dependent foci.

6. The measuring apparatus of claim 5, wherein the at least one lens element defines an optical axis, and the moveable optical element is moveable transverse to the optical axis.

7. The measuring apparatus of claim 5, wherein the at least one lens element defines an optical axis, and the moveable optical element is moveable along said optical axis.

8. The measuring apparatus of claim 1, wherein the optical system comprises at least one mirror configured for directing the polychromatic light through the at least one lens element.

9. The measuring apparatus of claim 1, wherein the optical system comprises at least one of a switchable polarizer and a switchable shutter in order to selectively produce either the first defined range of color dependent foci or the second defined range of color dependent foci in front of the at least one lens element.

10. The measuring apparatus of claim 1, wherein the optical system is designed so as to have a non-linear chromatic aberration characteristic having a first part corresponding to the first defined range of color dependent foci and having a second part corresponding to the second defined range of color dependent foci.

11. The measuring apparatus of claim 1, wherein the sensor head is arranged at an axial distance from the workpiece table, and the selector is coupled to the controller in order to move the sensor head relative to the workpiece table along said axial distance in order to select between the coarse measurement mode and the fine measurement mode.

12. The measuring apparatus of claim 1, wherein the first defined range has a center focus located at a defined spacing from the at least one lens element, said defined spacing being at least 3 times as large as the first defined range.

13. The measuring apparatus of claim 1, wherein the optical system comprises a plurality of lens elements including a positive lens element made of a first glass type and a second lens element made of a second glass type, said first glass type having a higher dispersion than the second glass type.

14. In a measuring apparatus for determining dimensional characteristics of a measurement object, the measuring apparatus comprising a workpiece table for positioning the measurement object, an evaluation unit configured to determine a positional information for a defined measurement point on the measurement object, and a selector for selecting between a coarse measurement mode and a fine measurement mode, a sensor head comprising:
  a polychromatic light source for generating polychromatic light having various wavelengths of light,
  a spectrometer, and
  an optical system having at least one lens element,
  wherein the optical system is configured to produce a first defined range of color dependent foci and a second defined range of color dependent foci in front of the at least one lens element, said second defined range being smaller than said first defined range,
  wherein the optical system is further configured to conduct light reflected from the measurement object onto the spectrometer,
  wherein the spectrometer is configured to generate a first spectral information when the measurement object is in the first defined range, and to generate a second spectral information when the measurement object is in the second defined range, and
  wherein the spectrometer is configured to provide the first spectral information to the evaluation unit in the coarse measurement mode and to provide the second spectral information to the evaluation unit in the fine measurement mode, to thereby enable the evaluation unit to exploit the first spectral information in the coarse measurement mode and exploit the second spectral information in the fine measurement mode.

15. A method of measuring dimensional characteristics of a measurement object, comprising the steps of:
  positioning the measurement object on a workpiece table,
  providing a sensor head at a defined distance from the workpiece table, the sensor head comprising a polychromatic light source for generating polychromatic light having various wavelengths of light, a spectrometer, and an optical system having at least one lens element, the optical system being configured to produce a first defined range of color dependent foci and a second defined range of color dependent foci in front of the at least one lens element, said second defined range being smaller than said first defined range, and the optical system further being configured to conduct light reflected from the measurement object onto the spectrometer,
  selecting between a coarse measurement mode and a fine measurement mode, and
  determining positional information for a plurality of defined measurement points on the measurement object using information from the spectrometer,
  wherein the spectrometer generates a first spectral information when the measurement object is in the first defined range, and the spectrometer generates a second spectral information when the measurement object is in the second defined range, and
  wherein the first spectral information is exploited in the coarse measurement mode and the second spectral information is exploited in the fine measurement mode.

16. The method of claim 15, where the step of selecting between a coarse measurement mode and a fine measurement mode comprises a step of positioning the measurement object either in the first defined range or in the second defined range.

* * * * *